H. J. MURRAY.
THERMOELECTRIC TRANSFORMER.
APPLICATION FILED APR. 11, 1918.
1,406,576.
Patented Feb. 14, 1922.
2 SHEETS—SHEET 1.
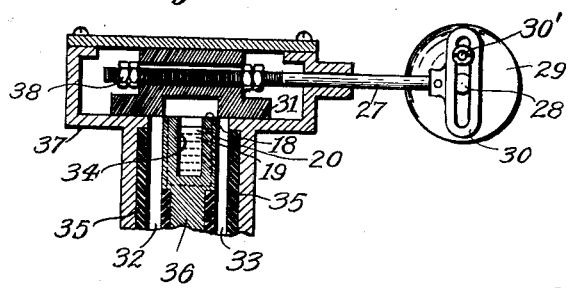
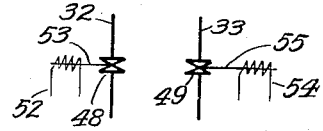
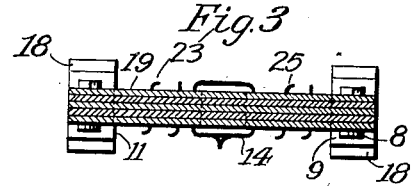
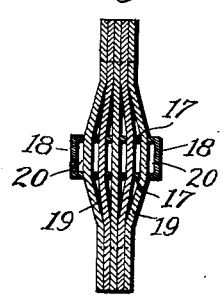
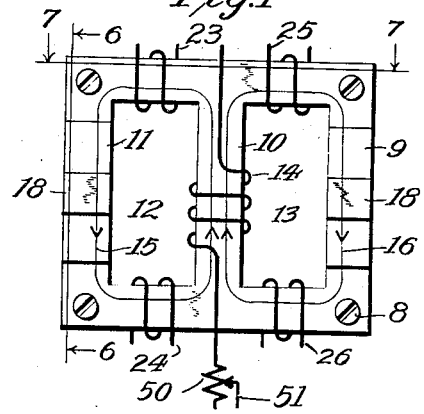
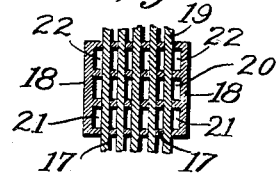
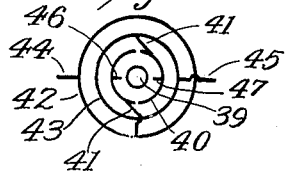
INVENTOR

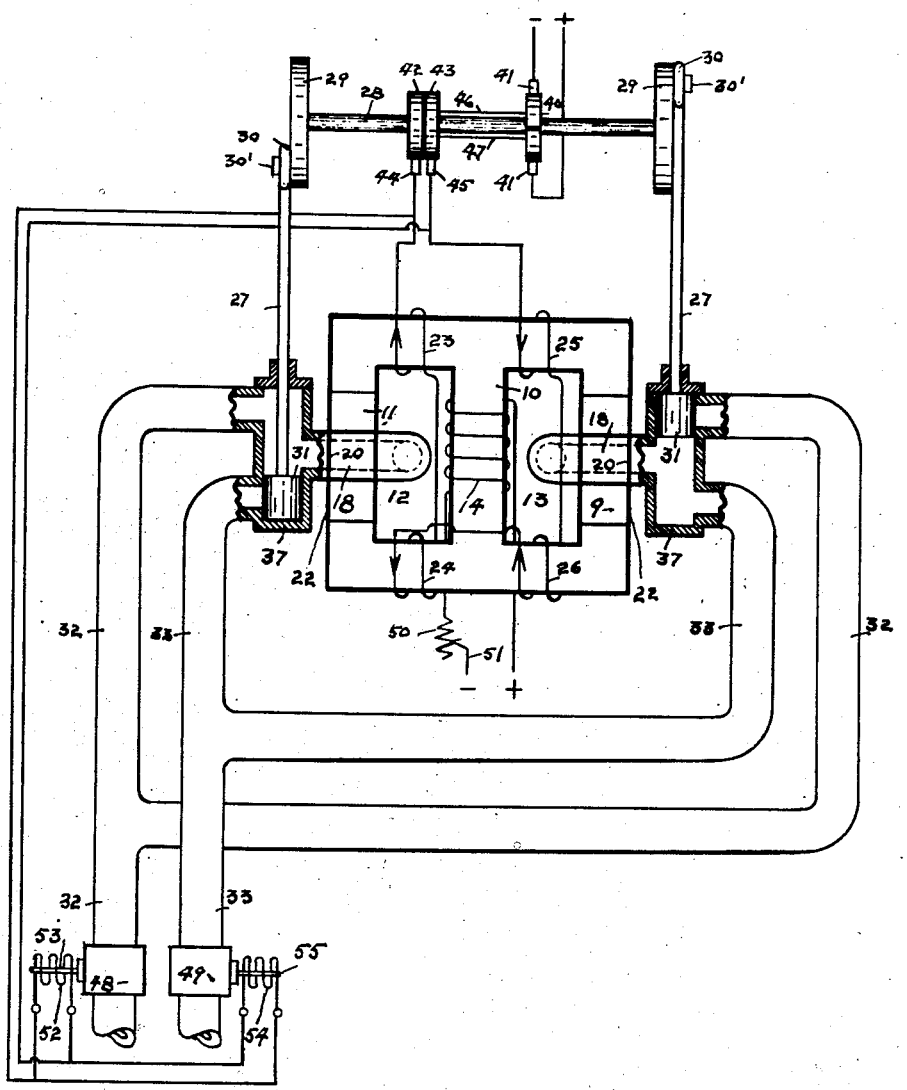

UNITED STATES PATENT OFFICE.

HOWARD J. MURRAY, OF BROOKLYN, NEW YORK.

THERMOELECTRIC TRANSFORMER.

1,406,576.  Specification of Letters Patent.  Patented Feb. 14, 1922.

Application filed April 11, 1918. Serial No. 228,031.

*To all whom it may concern:*

Be it known that I, HOWARD J. MURRAY, a citizen of the United States, and resident of Brooklyn, in the county of Kings and State of New York, have invented certain new and useful Thermoelectric Transformers, of which the following is a specification.

My invention relates in general to the production of electric energy by means of electromagnetic induction.

In devices of this character as hereinbefore known in the art the armature carrying the inductors is rotated or moved relative to the field.

One of the objects of my invention is to provide a simple form of electric generator by which, when heat is applied or withdrawn from a portion of its field, an electric current will be produced in the armature. In one embodiment of my invention, I broadly attain the production of electric current by moving the lines of force comprising the magnetic field by means of heat in such a manner that inductors are caused to link or unlink with said magnetic field during its movement.

For the purpose of explaining a theory of action which is believed to underlie the principles of my invention, let it be assumed that means are provided for creating a plurality of lines of force constituting a magnetic field. Let it also be assumed that an inductor, or system of inductors forming part of a closed circuit is linked with the magnetic field.

Now the total lines of force in a given magnetic path will depend upon its permeability and the permeability is affected by temperature, or change of temperature. It is an accepted fact that with weak magnetizing forces the permeability increases with rises of temperature up to the critical point, or about 785 degrees, centigrade, above which iron becomes non-magnetic. Under moderate magnetizing forces the permeability first increases slightly, with rise of temperature, and then decreases rapidly as the critical point is approached. Under strong magnetizing forces the permeability suffers no change at first, and then decreases gradually as the critical point is approached.

Hence, if under moderate magnetizing forces a portion, or the entire mass of the medium containing the resulting field is heated above the critical temperature, the number of lines of force of the said field will decrease. When the temperature is lowered below the critical point the number of lines of force will increase.

Whether the medium is subjected to weak, moderate, or strong magnetizing forces the number of lines of force will vary as the critical temperature is approached and passed in either direction. As the maximum change of permeability takes place over a comparatively small range of temperature around the critical temperature, it is evident that the said change of temperature can be effected in a comparatively short interval of time. Also, if the magnetic field is provided with a plurality of paths and some heated as others are cooled the total number of lines of force existing in the said given field may be caused to remain approximately constant. This is possible because the lines in some paths could be decreasing in number as others are increasing in number. Under such conditions there will be practically no self-induction taking place in the so-called field winding.

If the lines of force are caused to increase and decrease in the various paths as the permeabilities are changed, then the said inductors coiled around the said paths will be caused to link and unlink with the said lines of force in proportion to the said increase or decrease. Hence, an electromotive force is caused to flow in the said inductors and in the external circuit of which they are a part.

In the case of two paths for the said magnetic field, the maximum rate of increase in one path would take place about the same time the maximum rate of decrease occurred in the other said path, and the inductors could be joined together to add their electromotive forces and an alternating current would flow in the external circuit. In the case of a plurality of paths and inductors, the electromotive forces could be commutated at the proper interval by means of a device similar to the so-called commutator used at present on direct current generators, and a uni-directional current would flow in the external circuit.

The magnitude of this electromotive force will depend upon the rate at which the said lines of force are cut or linked with the inductors, that is, upon the total number of magnetic lines of force linked or unlinked with the inductors in a unit of time. If the rate of linking or unlinking the moving lines of force is constant, the electromotive force will be constant, but if the rate varies the instantaneous values of the electromotive force induced in the said inductors will vary accordingly. The same action occurs whether the field is linked or unlinked with the inductors.

The direction of the resultant electric current flowing in the closed circuit of the inductor due to the electromotive force when linking will be opposite to the direction of the current flowing when the said field is unlinking with the said inductor.

Hence, by alternately heating a portion of a magnetic field up to the critical point and beyond and then equally lowering the temperature, an alternating current will be induced in the inductors, and this alternating current may be rectified into direct current.

In other words, the device becomes a thermo-electric transformer.

The invention is susceptible of numerous physical embodiments, only one of which is set forth, but it is understood that the showings in the drawings are largely diagrammatic, merely being sufficient in detail to show an application of the invention.

While the invention is obviously capable of use with any form of heat reaching the temperature required, the invention is particularly applicable to gas in the state of combustion and it is in connection with this particular use that the invention will be described in detail.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the drawings:

Figure 1 shows a physical embodiment of my invention comprising a built-up laminated form of metal with the field and so-called armature windings.

Figure 2 is a transverse sectional view taken approximately on the line 2—2 of Figure No. 1.

Figure 3 is a transverse sectional view taken on the line 3—3 of Figure No. 1.

Figure 4 is a transverse sectional view of details which may be applied to Figure No. 2, showing a combined heating and cooling method.

Figure 5 is a transverse sectional view, showing a means for controlling the rate and frequency of applying heat and cooling.

Figure 6 is a diagrammtaic view, showing one form of a commutating device.

Figure 7 is a diagrammatic view of the means for controlling the amount of heat and cold supplied to the rate control means of Figure No. 5.

Figure 8 is a diagrammatic view of a general assembly showing the electrical and mechanical connections between Figs. 5, 6, and 7.

In the following description and in the claims, parts will be identified by specific names for convenience of expression, but they are intended to be as generic in their application to similar parts as the art will permit.

Referring to the embodiment of the invention disclosed in Figures Nos. 1, 2 and 3, there is shown a built-up laminated form of paramagnetic metal sheets held together by the bolts, #8. These sheets are made so that openings #12 and #13 are formed. On the central portion #10 there is wound a field winding, #14, connected to a source of current supply, through the variable resistance, #50, and the wiper, #51. When current is flowing in this winding #14, a magnetic field will be created in the portion #10 of the laminated form, and the lines of force of this field will follow the path of least magnetic resistance and arrange themseves in the portions #9 and #11. Allowing for some leakage and assuming the same permeability, the portion #9 will contain as many lines of force as the portion #11. The lines of force are indicated by #15 and #16.

The portions #9 and #11 have the laminations held apart by the spacers, #17, preferably made of heat-resisting and heat-insulating material. On the outside sheets there is placed a cap or cover, #18, of the same material as #17.

The spacers #17 and the cap #18 are arranged so as to form a closed flue or pipe and, hence, conduct a source of heat to the surfaces of the thin laminations #19, comprising the built-up form. At the same time the spacers #17 prevent the leakage of the heat to other portions of the laminations #19.

In Figure No. 4 there is shown a modification of the spacers #17' and the cap #18' by means of which three flues or passageways are formed. The central passageway composed of the openings #20' conducts a heating medium, while the passageways composed of openings #21 and #22 conduct a medium having a temperature which reduces the temperature of the surfaces of the laminations #19 and prevents the heat from the centrally positioned flue formed by #17 and #18 from being conducted to the remainder of the laminated form.

The windings #23, #24, #25 and #26 may be termed armature windings and they may be connected in the most efficient way to form an external circuit or circuits.

Referring to Figure No. 5 a heat and cold supply control is illustrated. The piston rod #27 is given a reciprocating motion by its connection with the shaft #28, through the head #30, pin #30', and pulley #29.

The shaft #27 actuates a slide valve mechanism #31, which may control heat supply through the duct #32, and a cold supply through the duct #33, or heat may be supplied through both ducts.

The device may be mounted adjacent to the section shown in Figure No. 2 as shown by the dotted lines in the space #34 of Figure No. 5.

The slide valve #31 and the connecting piece #36 are preferably made of the same material as #17 and #18, while #35 is shown to indicate that the flues #32 and #33 are covered with material of low heat conductivity. The casing #37 may be made of cast iron or steel.

Figure No. 6 is a diagrammatic view indicating a shaft #39, a commutator #40, brushes #41, slip rings #42 and #43, slip ring connections #44 and #45, and commutator connections #46 and #47. The shaft #39 of Figure No. 6 and the shaft #28 of Figure No. 5 are mechanically or electrically connected so as to function properly.

Figure No. 7 illustrates diagrammatically the control valves #48 and #49 placed in the line of pipes or flues #32 and #33 shown in Figure No. 5. Both of these valves are controlled magnetically. Valve #48 is controlled by plunger #53 actuated by winding #52, and valve #49 is controlled by plunger #55 actuated by winding #54.

In operation it will be understood in connection with the device shown in Figure No. 1, first that passing a current through the winding #14 will create a magnetic field in the portion #10, this current and, hence, the strength of the said field may be varied by means of the resistance #50 and the wiper #51. As is well understood, these lines of force will arrange themselves in the portions #9 and #11 in equal proportions if the reluctances of the two paths are equal. For the purpose of explanation, we will assume that the paths are equal and that there is an equal number of lines of force in each path. Under these conditions the same number of lines of force are linked with the windings #23, #24, #25 and #26. But the paths #9 and #11 have the laminations spaced apart for a portion of their lengths as shown by the section as illustrated in Figures Nos. 2, 3 and 4.

Now, if a source of heat is brought adjacent to the laminations #19 of portion #11 and the openings #20, and forced through the openings #20, heat will be imparted to the surfaces of the laminations #20 and by conduction this heat will be quickly imparted to the entire mass of the lamination, a temperature will be reached which will cause the permeability of the path #11 to decrease, and accordingly a number of the lines of force in portion #11 will be forced to unlink with the windings #23 and #24, and an electromotive force will be imparted to the circuit of these windings. At the same time a number of lines of force will be added to the portion #9 and an electromotive force will be induced in the circuits of the windings #25 and #26. As the temperature of the laminations of portion #11 is increased to the critical point and above, the permeability of #11 will continue to change until the metal of #19 becomes non-magnetic and all the lines of force will have been forced to cut the windings #23 and #24, with a proportionate electromotive force induced according to the rate of their cutting. During this time lines of force have been added to the portion #9 with a resultant electromotive force in the windings #25 and #26. The number of lines of force added to #9 will not be equal to the number forced to leave the path #11 but will depend on the magnetizing force produced in path #10 by the winding #14. Now, if the temperature of #11 is decreased and heat is applied to the spaced apart portions of the path #9 until the permeability of #9 decreases, then the lines of force will unlink with the windings #25 and #26, and the lines will link with windings #23 and #24. Within certain limits this linking and unlinking will continue as the laminations of the path #9 are raised to a higher temperature and the laminations of #11 are cooled to a lower temperature. A condition is eventually reached when the path #9 is non-magnetic and the path #11 has become a container of the same number of links of force existing in #9 before the action began. By alternately heating #9 and cooling #11, and heating #11 and cooling #9, the magnetic field is forced from one path to the other. During this change the lines moving to or from the path #11 are linking or unlinking with the windings #23 and #24; also the lines moving to or from the path #9 are linking or unlinking with the windings #25 and #26. As lines are linking with windings #23 and #24 when other lines are unlinking with windings #25 and #26, the relative direction of current will be in opposite directions but the windings may be connected to an external circuit in the most efficient manner to add the respective electromotive forces. The frequencies of all induced currents will be the same as the cycle of operation in each path will be of the same duration. However, it will be possible to vary the rate of heating and cooling so that a cycle of current will contain waves of different frequencies.

By referring to the modifications as illustrated in Figure No. 4, we have a method of cooling the metal adjacent to the heated portion so as to prevent the high temperature from spreading to the entire form.

A medium of comparatively lower temperature is constantly forced or drawn through the openings #21 and #22 as the working medium is passed through the openings #20. The heat taken up from the openings #21 and #22 may be used to give initial heat to the medium that eventually returns through the openings #20 at a higher temperature.

The spacers #17 and the caps #18 are preferably made of a non-magnetic medium having high temperature, and heat resisting qualities.

In the case of Figure No. 2 the heat of laminations #19 would partially escape through the openings therebetween by natural means.

The rate of heating and cooling the laminations #19 of paths #9 and #11 may be controlled by an arrangement shown in Figure No. 5. The shaft #28 rotates the disc #29 in either direction. Motion is imparted to the pin #30 which, in turn, causes a reciprocating motion of rod #27. The slide valve #31 is attached to the rod #27 by means of lock nuts #38 and, therefore, reciprocates with the rod #27. The flue #32 is connected to a source of heat and the flue #33 to a source of cold or a source of heat of considerably lower temperature than that of #32. Hence, the laminations #19 will be heated when the rod #27 has moved to the extreme left displacement, and cooled when the rod #27 has moved to the extreme right displacement. It is evident that the frequency of the induced electromotive forces in the windings #23, #24, #25 and #26 will be a function of the speed of the shaft #28 and, if the shaft #39 of Figure No. 6 is connected to the shaft #28, the slip rings #42 and #43, together with the brushes #41, will be rotated with the same speed as the disc #29. As the brushes #44 and #45 are stationary and connected to the windings #23, #24, #25 and #26, it is evident that commutation will take place in proper synchronism with the alternations of the induced currents and a uni-directional current will be delivered to the stationary leads #46 and #47.

The amount of heat and cold delivered to the laminations #17 will, of course, largely depend on the respective temperatures and pressures, the cross-section of the paths, etc.

With any given set of conditions the respective amounts may be more finely controlled by means of the valves #48 and #49 shown diagrammatically in Figure No. 7, and it is evident that these valves may be still further controlled by the current induced in the windings #23, #24, #25 and #26, or by magnets #52 and #54 controlled by the said current.

In other words, it is possible by means of the above arrangement to transform heat into magnetic energy and then transform the magnetic energy into electrical energy. It is still further possible to produce this electrical energy at any desired frequency. It is also possible to rectify this alternating electrical energy into uni-directional electrical energy, and at the same time control the voltage and the magnitude of the current.

While I have shown and described and have pointed out in the annexed claims, certain novel features of my invention, it will be understood that various changes may be made in the construction and arrangement of the several parts as, for instance, any possible form of path for the magnetic field may be used, or any combination of paths and forms may be used. Also all possible methods of linking and unlinking the inductors may be used. Furthermore, the methods of obtaining the greatest surface for a given cross-section of path are numerous, as well as the methods of controlling the heat and cooling.

Having thus described my invention, I claim:

1. In a device of the class described, the combination with a magnetic structure providing a plurality of flux paths each having an individual portion and a portion in common and a common means for producing magnetic flux in said paths, means for alternately heating and cooling the individual portions thereof to vary the permeability, whereby the total flux is maintained substantially constant.

2. In a device of the class described, the combination with a laminated magnetic structure providing a plurality of flux paths each having an individual portion and a portion in common and a common means for producing magnetic flux in said paths, means for inversely heating and cooling the individual portions thereof to vary the permeability, whereby the total flux is maintained substantially constant.

3. In a device of the class described, the combination with a magnetic structure providing a plurality of flux paths each having an individual portion and a portion in common and a common means for producing magnetic flux in said paths, means providing inductors coiled about the said individual portions, means for alternately heating and cooling the individual portions thereof to vary the permeability, whereby the total flux is maintained substantially constant.

4. In a device of the class described, the combination with a magnetic structure providing a plurality of flux paths each having an individual portion and a portion in common and a common means for producing magnetic flux in said paths, means for alternately heating and cooling the individual portions thereof to vary the permeability at a desired rate and amount, whereby the total flux is maintained substantially constant, and means providing inductors positioned about the said individual portions so as to be affected by the said varying permeability whereby electric pressure will be produced in the said inductors.

5. In a class of the device described, the combination with a magnetic structure providing a plurality of flux paths each having an individual portion and a portion in common and a common means for producing magnetic flux, in said paths, means for alternately heating and cooling the individual portions thereof to vary the permeability, whereby the total flux is maintained substantially constant, means comprising an organization of inductors designed to be affected by the said flux due to the said varying permeability, whereby alternating electric current is caused to flow in the said inductors, and rotary means designed to rectify the said alternating current.

6. In a device of the class described, the combination with a magnetic structure providing a plurality of flux paths each having an individual portion and a portion in common and a common means for producing a variable magnetic flux in said paths, means for alternately heating and cooling the individual portions thereof to vary the permeability at a desired rate and amount, whereby the total flux is maintained substantially constant, and means comprising inductors operatively associated with the said paths, whereby the said moving flux will induce an electric current in the said inductors.

7. In a device of the class described, the combination with a magnetic structure providing a plurality of flux paths each having an individual portion and a portion in common and a common means for producing magnetic flux in said paths, automatically controlled means for alternately heating and cooling the individual portions thereof to vary the permeability, whereby the total flux is maintained substantially constant, and means comprising a system of inductors operatively associated with said flux and said controlling means.

8. In a device of the class described, the combination with a magnetic structure providing a plurality of flux paths each having an individual portion and a portion in common and a common means for producing magnetic flux in said paths, means for intermittently heating the individual portions thereof to vary the permeability, whereby the total flux is maintained substantially constant, means for controlling the amount of the said heat and thereby the variation of the said permeability, and means for cooling the said magnetic structure.

9. In a device of the class described the combination with a magnetic structure providing a plurality of flux paths each having an individual portion and a portion in common and a common means for producing magnetic flux in said paths, means for varying said flux producing means, means for heating and cooling the individual portions thereof to vary the permeability, whereby the total flux is maintained substantially constant, means for controlling the time and magnitude of the said heat and cold thereby to affect the time and magnitude of the said varying flux in the said individual portions, means comprising inductors arranged to be linked and unlinked with the said varying flux thereby to induce electric current in the said inductors, means comprising conductors designed to connect the said system of inductors to an external circuit and to the said control means, and rotatable means including a mechanical rectifier operatively connected to the said control means.

10. In a device of the class described the combination with a magnetic structure providing a plurality of flux paths each having an individual portion and a portion in common and a common means for producing magnetic flux in said paths, means for heating and cooling one said individual portion independently from another said individual portion thereof to vary the permeability whereby the total flux is maintained substantially constant.

11. In a device of the class described, the combination with a magnetic structure providing a plurality of flux paths each having an individual portion and a portion in common and a common means for producing magnetic flux in said paths, means for alternately heating and cooling the individual portions thereof to vary the permeability, whereby the total flux is maintained substantially constant, and means providing ventilation for a portion of the said flux paths.

Signed at Brooklyn, N. Y., in the county of Kings and State of New York, this 10th day of April, A. D. 1918.

HOWARD J. MURRAY.

Witness:
H. S. RICHMOND.